US008042655B1

(12) United States Patent
Ablabutyan et al.

(10) Patent No.: US 8,042,655 B1
(45) Date of Patent: Oct. 25, 2011

(54) ROLL STOP FOR A LIFT

(75) Inventors: Karapet Ablabutyan, Glendale, CA (US); Levon Hambardzumyan, Glendale, CA (US)

(73) Assignee: Maxon Industries, Inc., Santa Fe Springs, CA (US)

( * ) Notice: Subject to any disclaimer, the term of this patent is extended or adjusted under 35 U.S.C. 154(b) by 687 days.

(21) Appl. No.: 12/101,873

(22) Filed: Apr. 11, 2008

(51) Int. Cl.
*B60P 1/00* (2006.01)
*B65F 3/00* (2006.01)
*B66B 9/08* (2006.01)

(52) U.S. Cl. ......... 187/200; 187/240; 414/546; 414/921

(58) Field of Classification Search .................. 187/200, 187/201, 202, 240; 414/921, 546
See application file for complete search history.

(56) References Cited

U.S. PATENT DOCUMENTS

| | | | | |
|---|---|---|---|---|
| 3,710,962 A | * | 1/1973 | Fowler, Jr. ........... | 414/545 |
| 5,975,830 A | * | 11/1999 | Goodrich et al. ........ | 414/541 |
| 6,305,897 B1 | * | 10/2001 | Budd et al. ........... | 414/540 |
| 6,398,479 B1 | * | 6/2002 | Dupuy et al. ........... | 414/540 |
| 6,692,217 B1 | * | 2/2004 | Pierrou ............... | 414/539 |
| 6,705,824 B2 | | 3/2004 | Ablabutyan et al. | |
| 2003/0091418 A1 | * | 5/2003 | Ranken et al. ......... | 414/545 |
| 2005/0238471 A1 | | 10/2005 | Ablabutyan et al. | |
| 2005/0238472 A1 | | 10/2005 | Sobota et al. ......... | 414/546 |
| 2006/0263183 A1 | * | 11/2006 | Goodrich ........... | 414/471 |
| 2007/0071569 A1 | * | 3/2007 | Sobota et al. ......... | 410/121 |

* cited by examiner

*Primary Examiner* — Michael Mansen
*Assistant Examiner* — Stefan Kruer
(74) *Attorney, Agent, or Firm* — Michael Zarrabian, Esq.; Myers Andras Sherman & Zarrabian LLP

(57) ABSTRACT

A roll stop system for a lift includes a roll stop member that is movable between a raised position and a lowered position, a driving mechanism for moving the roll stop member between the raised position and the lowered position, and a spring member acting as a buffer between the driving mechanism and the roll stop member, and preferably the spring member protects the driving mechanism from damage due to abnormal operations of the roll stop member.

19 Claims, 19 Drawing Sheets

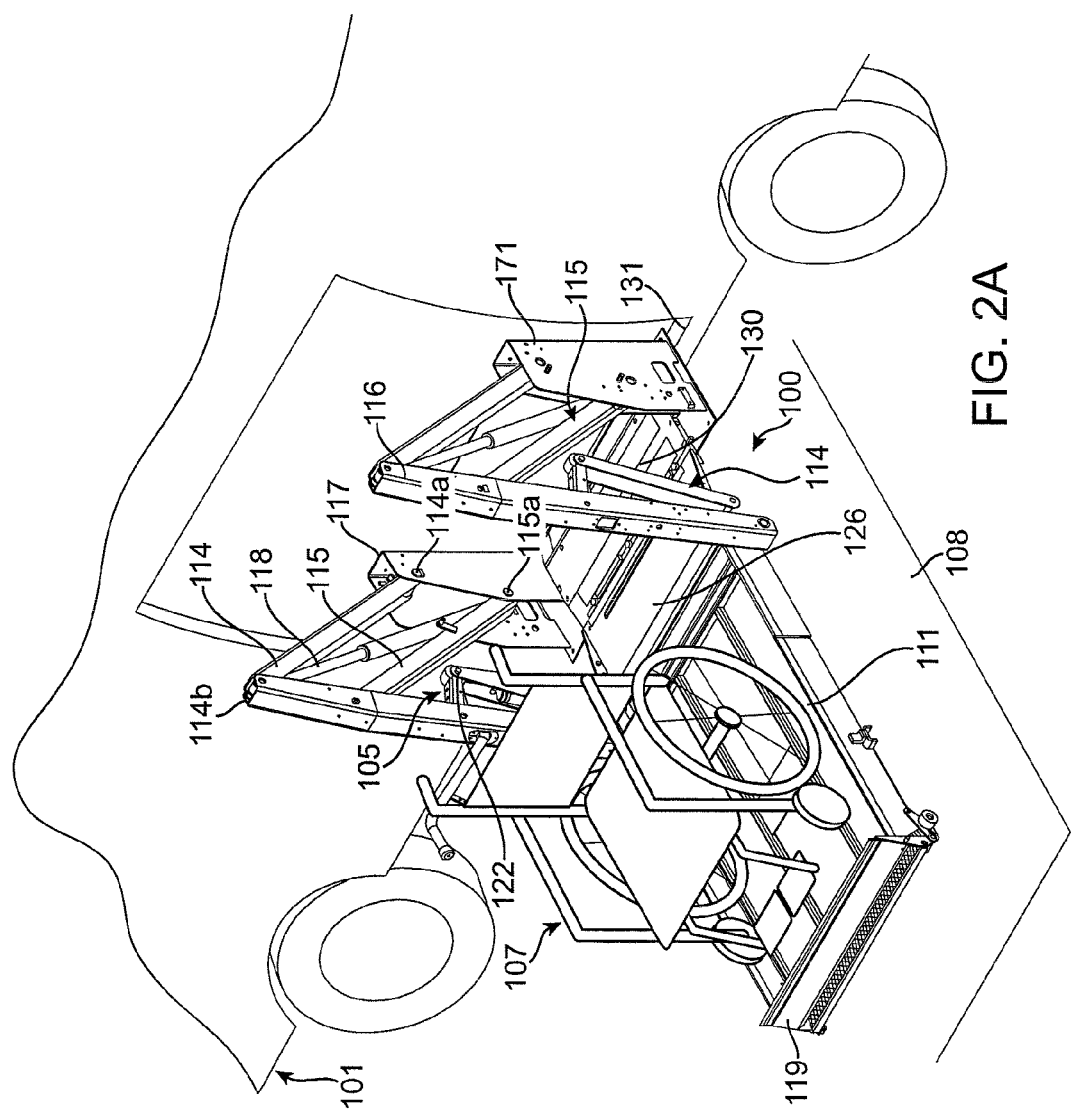

ROLL STOP FOR A LIFT

BACKGROUND OF THE INVENTION

1. Field of the Invention

The present invention relates generally to a lift for a vehicle, and in particular to a roll stop for the lift.

2. Description of Related Art

Lift systems are used in conjunction with vehicles to transport wheelchairs, persons, and cargo, etc. Some of these lift systems are self supporting and can be rolled or otherwise pushed against a vehicle opening. Other such systems are appended to the bottom of a vehicle chassis while others are supported at or about the sidewall of the vehicle proximate the vehicle opening. The lift systems are configured to raise and lower a wheelchair, a passenger, or cargo to and from the vehicles using a platform. The platform may be raised or lowered between the ground and the vehicle using, for example, hydraulic or electrical, actuators that provide the lifting force.

Typical lift systems are provided with certain general design components dictated principally by the need to capture and lift the wheelchair-bound passenger or cargo in a safe fashion, as well as to enable the systems to fold or be made unobtrusive when not in use, such as when the vehicle is moving.

A common lift design is a parallelogram design that uses two sets of lift arms arranged in a parallelogram or near-parallelogram arrangement on either side of the platform. Using the parallelogram keeps the lift platform in a horizontal orientation, i.e., parallel to the ground level, when the lift platform is being moved up and down.

This lift design also provides for a storage orientation enabling the platform to swing in a ninety degree arc to assume a substantially vertical orientation once the passenger or cargo is on board to enable the vehicle to proceed in a normal fashion.

The lift systems typically also include inboard and outboard roll stops on front and rear edges of the lift platform to prevent the wheelchair or cargo from inadvertently sliding off the platform during transition, and to act as ramps for loading and unloading when the platform is on the ground or level with the vehicle bed. In a typical configuration, the outboard roll stop rotates from a substantially vertical orientation to a substantially horizontal orientation acting as a ramp at ground level to enable a wheelchair to be rolled onto the platform. At the same time, the inward roll stop is at a substantially vertical orientation to prevent the wheelchair from inadvertently traveling off of the platform at its inner edge.

As the hydraulics are actuated resulting in lifting of the platform, both the outboard and inboard roll stops maintain a substantially vertical orientation, thus capturing the wheelchair or cargo on the platform. Once the platform reaches the vehicle entrance, the outboard roll stop maintains its substantially vertical orientation, while the inboard roll stop travels in an arc to act as a bridge plate between the platform and the vehicle bed.

Various mechanisms have been provided to enable the inboard roll stop to move from a blocking (vertical) orientation to a loading (horizontal) orientation simultaneously as the wheelchair reaches the vehicle opening without human intervention. Likewise, as the platform is lowered from the vehicle opening towards ground level, the roll stop actuating mechanisms can simultaneously move the inboard roll stop to a blocking orientation without input from the operator.

BRIEF SUMMARY OF THE INVENTION

In one embodiment, the invention provides a lift system that is configured for use with a vehicle. In this embodiment, the lift system includes a platform configured to raise and lower cargo to and from a vehicle bed and a roll stop system. In one embodiment the roll stop system includes a roll stop member that is movable between a raised position and a lowered position, a driving mechanism for moving the roll stop member between the raised position and the lowered position, and a spring member acting as a buffer between the driving mechanism and the roll stop member, and preferably the spring member protects the driving mechanism from breakage.

In one aspect, the spring member includes a gas spring.

In another aspect the spring member is substantially collapsed when a force necessary to move the roll stop member from the lowered position to the raised position is applied.

In yet another aspect, in the lift system during normal operation, the force necessary to move the roll stop member from the lowered position to the raised position is below the predetermined threshold.

In another aspect the spring member is substantially extended when a force necessary to move the roll stop member from the lowered position to the raised position is applied.

In yet another aspect, in the lift system during normal operation, the force necessary to move the roll stop member from the lowered position to the raised position is below the predetermined threshold.

In still yet another aspect, the driving mechanism includes a cable connected at one end of the roll stop member for raising or lowering the roll stop member, a lever connected to another end of the cable for providing a pulling force, and a movable pulley that is rotatably connected to an end of the spring member.

In a further aspect, the driving mechanism further comprises an actuator for driving the lever, wherein the spring member is fixedly coupled to an arm of the lift system.

In another aspect, the spring member includes a gas spring having an outer cylinder and an inner cylinder, and the movable pulley is rotatably connected to the outer cylinder.

In one aspect, the spring member includes a gas spring having an outer cylinder and an inner cylinder, and the movable pulley is rotatably connected to the inner cylinder.

In yet another aspect, the driving mechanism further includes an actuator for actuating the lever.

In another embodiment, the invention provides a roll stop system for a lift includes a roll stop member that is movable between a raised position and a lowered position, a driving mechanism for moving the roll stop member between the raised position and the lowered position, a spring member acting as a buffer between the driving mechanism and the roll stop member.

In one aspect, the spring member includes a gas spring.

In another aspect, the spring member is substantially collapsed when a force necessary to move the roll stop member from the lowered position to the raised position is applied.

In yet another aspect, during normal operation the force necessary to move the roll stop member from the lowered position to the raised position is below the predetermined threshold.

In another aspect, the spring member is substantially extended when a force necessary to move the roll stop member from the lowered position to the raised position is applied.

In yet another aspect, during normal operation the force necessary to move the roll stop member from the lowered position to the raised position is below the predetermined threshold.

In still another aspect, the driving mechanism includes a cable connected at one end to the roll stop member for raising or lowering the roll stop member, a lever connected to another end of the cable for providing a pulling force, and a movable pulley rotatably connected to an end of the spring member.

In a further aspect, the driving mechanism further includes an actuator for driving the lever, and the spring member is fixedly connected to an arm of the lift system.

In an additional aspect, the spring member includes a gas spring having an outer cylinder and an inner cylinder, and the movable pulley is rotatably connected to the outer cylinder.

In still a further aspect, the spring member includes a gas spring having an outer cylinder and an inner cylinder, and the movable pulley is rotatably connected to the inner cylinder.

In yet another aspect, the driving mechanism further includes an actuator for actuating the lever.

In still another embodiment, the invention provides a method for actuating a roll stop member of a lift system, the method includes providing the roll stop member, where the roll stop member is movable between a raised position and a lowered position, driving the roll stop member between the raised position and the lowered position, providing a buffer when a force applied to the roll stop member exceeds a predetermined threshold.

In one aspect, the providing the buffer includes compressing a spring member when the force applied to the roll stop member exceeds a predetermined threshold.

BRIEF DESCRIPTION OF THE DRAWINGS

The embodiments are illustrated by way of example, and not by way of limitation, in the Figures of the accompanying drawings and in which like reference numerals refer to similar elements and in which:

FIG. 2A shows a perspective view of the lift system of FIG. 1A in its floor level position;

DETAILED DESCRIPTION OF THE INVENTION

The Embodiments discussed herein generally relate to a roll stop system for a lift. Referring to the Figures, exemplary embodiments will now be described. The exemplary embodiments are provided to illustrate the embodiments and should not be construed as limiting the scope of the embodiments.

Figure 1A:
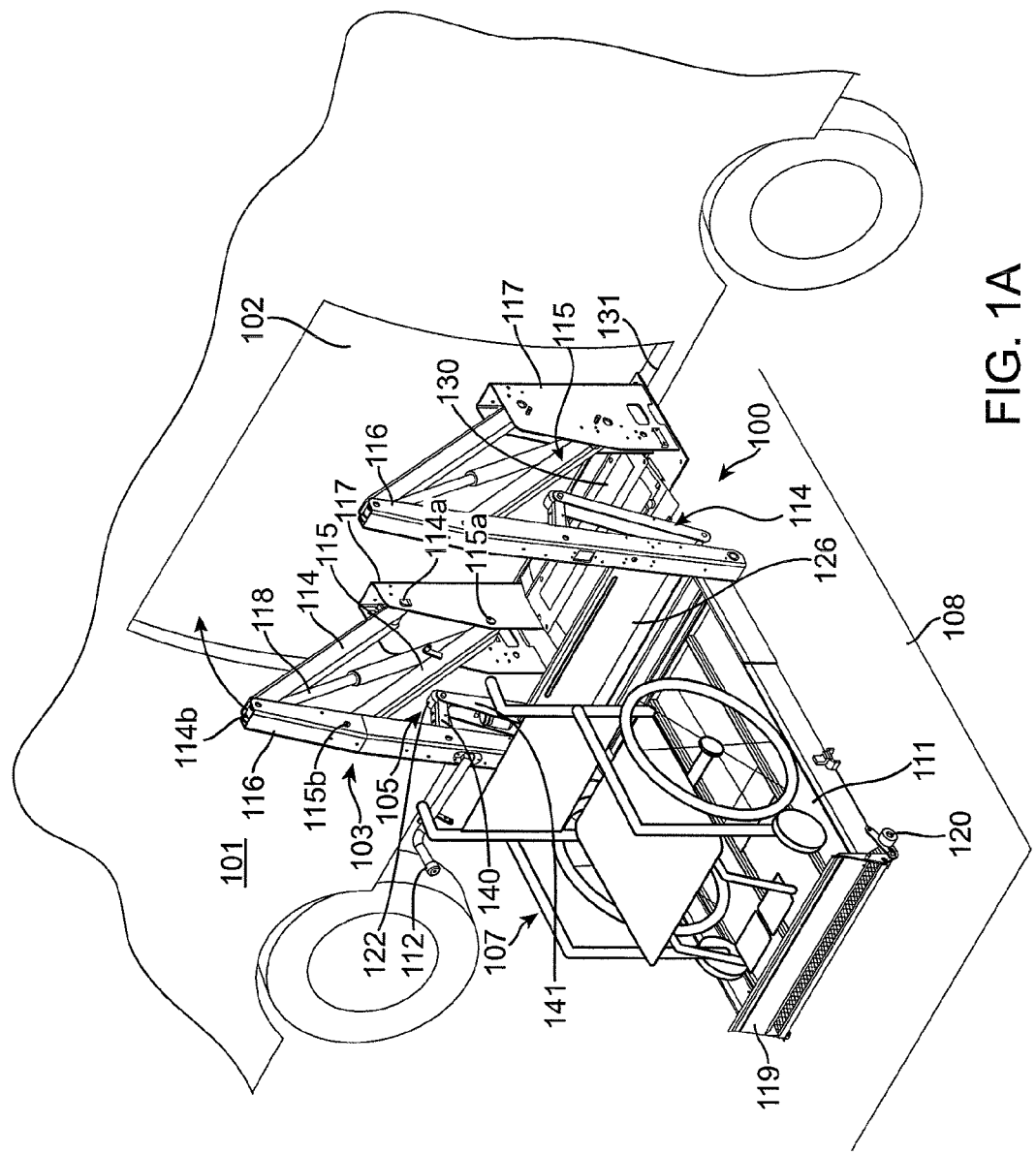
FIG. 1A shows a perspective view of a vehicle with a lift system in a transit position.

FIG. 1A illustrates a lift system 100 in accordance with an embodiment of the invention. Lift system 100 as shown is connected to a vehicle 101 at a side entrance 102. In other embodiments, lift system 100 is located at other locations of vehicle 101, such as at a rear end. Lift system 100 includes an upper arm 114 and lower arm 115 connected to frame 117 and vertical arm 116. Pivot points 114a and 115a where upper arm 114 and lower arm 115 connect to frame 117, and pivot points 114b and 115b where upper arm 114 and lower arm 115 connect to vertical arm 116, form the four points of an upper parallelogram or a near-parallelogram 103. Upper parallelogram 103 keeps platform 111 substantially parallel to the ground level 108 when platform 111 is raised or lowered. Lift actuator 118 is connected to pivot point 114b and to pivot point 115a. In one embodiment lift actuator 118 includes a hydraulic cylinder, and a pump for driving the cylinder. In another embodiment, electromechanical actuators are used. Frame 117 is designed to be fixedly connected to the vehicle 101, and may include extension plate 130 fixedly connected to the vehicle bed 131 for ridged attachment.

In one embodiment platform 111 is connected to vertical arm 116, and is movable between a raised position and a lowered position. An inboard roll stop member 126 and an outboard roll stop member 119, also known as bridge plates, are connected to platform 111. Stow linkage 105 is also connected to platform 111. Stow linkage 105 includes upper stow arm 140, lower stow arm 141, and roller 122.

Handrail 112 is connected to upper stow arm 140 of stow linkage 105. In one embodiment, a pair of such handrails 112 are used, one on each side of platform 111, as safety barriers or for a passenger to hold on to. A safety belt or harness (not shown) may also be included in the system.

In one embodiment, an outboard roll stop linkage 120 is connected to outboard roll stop 119. In another embodiment outboard roll stop 119 may be spring biased in a substantially vertical orientation when lift platform 111 is in transition. The vertically-oriented roll stop 119 prevents wheelchair 107 from inadvertently traveling over the outer edge of platform 111. When platform 111 reaches ground level 108, the outboard roll stop linkage 120 contacts the ground 108, and may automatically cause outboard roll stop 119 to rotate into a substantially horizontal orientation. The horizontally-oriented outboard roll stop 119 acts as an outboard ramp to enable entry and egress to and from platform 111.

FIG. 1A illustrates lift system 100 in a transition from ground level 108 toward vehicle bed 131. Both the outboard roll stop 119 and the inboard roll stop 126 are raised, which prevents the passenger or cargo from traveling off platform 111.

Figure 1B:
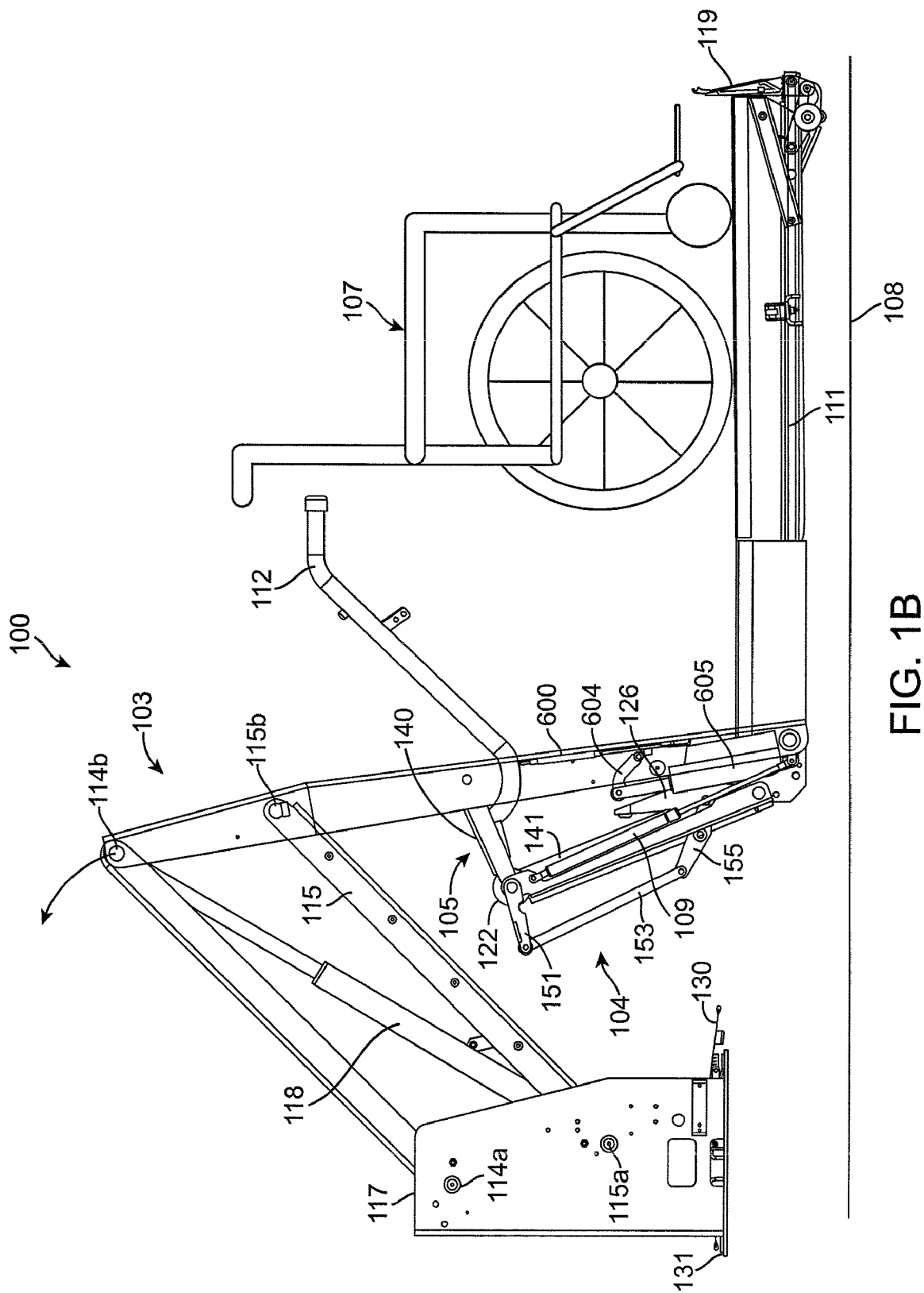
FIG. 1B shows a side view of the lift system of FIG. 1A.

FIG. 1B illustrates a side view of lift system 100 in transition as in FIG. 1A. As shown, platform 111 is proximate to the ground level 108, while both the outboard roll stop 119 and the inboard roll stop 126 are in their vertical orientation, or "up" positions, preventing wheelchair 107 from rolling off platform 111 while the platform is being raised or lowered. Outboard roll stop 119 may be automatically raised when the outboard roll stop linkage 120 lifts off the ground 108 and no longer contacts the ground 108, thus preventing the passenger from traveling off platform 111. The inboard roll stop 126 is still raised.

As illustrated, stow linkage 105 further includes a lower parallelogram or near parallelogram 104 formed by arms 151, 153, 155, and lower stow arm 141. In one embodiment lower parallelogram 104 may enter a sliding engagement with a lower surface of lower arm 115 of upper parallelogram 103. Lower parallelogram 104 in sliding engagement with upper parallelogram 103 facilitates stowage and other platform actuation orientations simultaneously with the motion of upper parallelogram 103.

U.S. Pat. No. 6,705,824 discloses an upper parallelogram structure and hydraulic apparatus for moving the upper parallelogram structure in order to move the platform, and a lower parallelogram structure. The lower parallelogram structure is in a sliding engagement with the upper parallelogram structure during at least a portion of the motion when the platform is moved between the ground and the vehicle opening. The lower parallelogram is also provided with a saddle bolt for a sliding engagement with the non-linear channel, such that movement of the lower parallelogram acts to raise and lower the roll stop upon movement of the platform. Thus, the operator can concentrate operating the platform without providing control input to the roll stops. U.S. Pat. No. 6,705,824 is assigned to the assignee of the present application. The disclosure of U.S. Pat. No. 6,705,824 is hereby incorporated by reference in its entirety.

U.S. Patent Application Pub. No. 2005/0238471 discloses a wheelchair lift having a logic module, which provides several interlocks that promote proper operation. U.S. Patent Application Pub. No. 2005/0238471 is assigned to the assignee of the present application. The disclosure of U.S. Patent Application Pub. No. 2005/0238471 is hereby incorporated by reference in its entirety.

As illustrated in FIG. 1B, stow linkage 105 includes storage actuator 109 to facilitate storage of lift platform 111. The inboard roll stop or bridge plate 126 as illustrated is actuated by a driving mechanism including a roll stop actuator 605, lever 604 and cable 602 (see FIG. 7). The inboard roll stop system also includes spring member 600 illustrated in FIG. 6. As described later in detail, in one embodiment spring member 600 is used as a buffer (or bumper) to absorb shock caused by abnormal operations of roll stop 126. Preferably, the spring member 600 prevents the driving mechanism (e.g., lever 604, cable 602 and/or roll stop 126) from damage (e.g., breaking, snapping, disconnecting) by abnormal operations of roll stop 126, described below. As such, "buffering" as used herein includes absorbing shock caused by abnormal operations of roll stop 126 and reducing/preventing risk of damage to the driving mechanism by abnormal operations of roll stop 126.

Figure 2B:
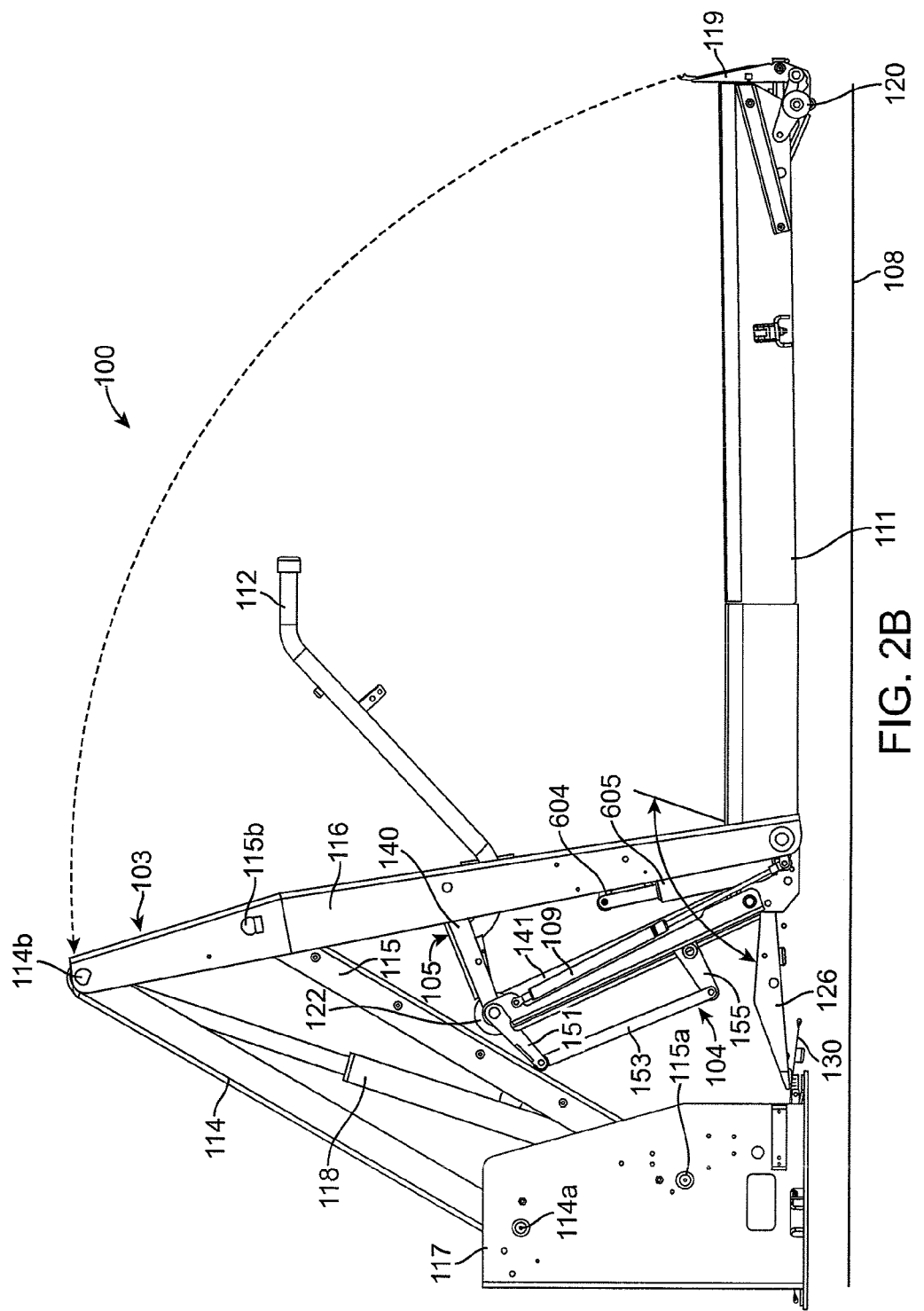
FIG. 2B shows a side view of the lift system of FIG. 2A in its floor level position.

FIG. 2A shows a perspective view of lift system 100 in a floor level position where platform 111 is level with vehicle bed 131. Inboard roll stop actuator 605 (FIG. 1B) lowers inboard roll stop 126, which becomes a ramp to extension plate 130, and allows wheelchair 107 to move in or out of vehicle 101. As illustrated outboard roll stop 119 is still raised. FIG. 2B illustrates a side view of lift system 100 in a floor level position as in FIG. 2A.

Figure 3A:
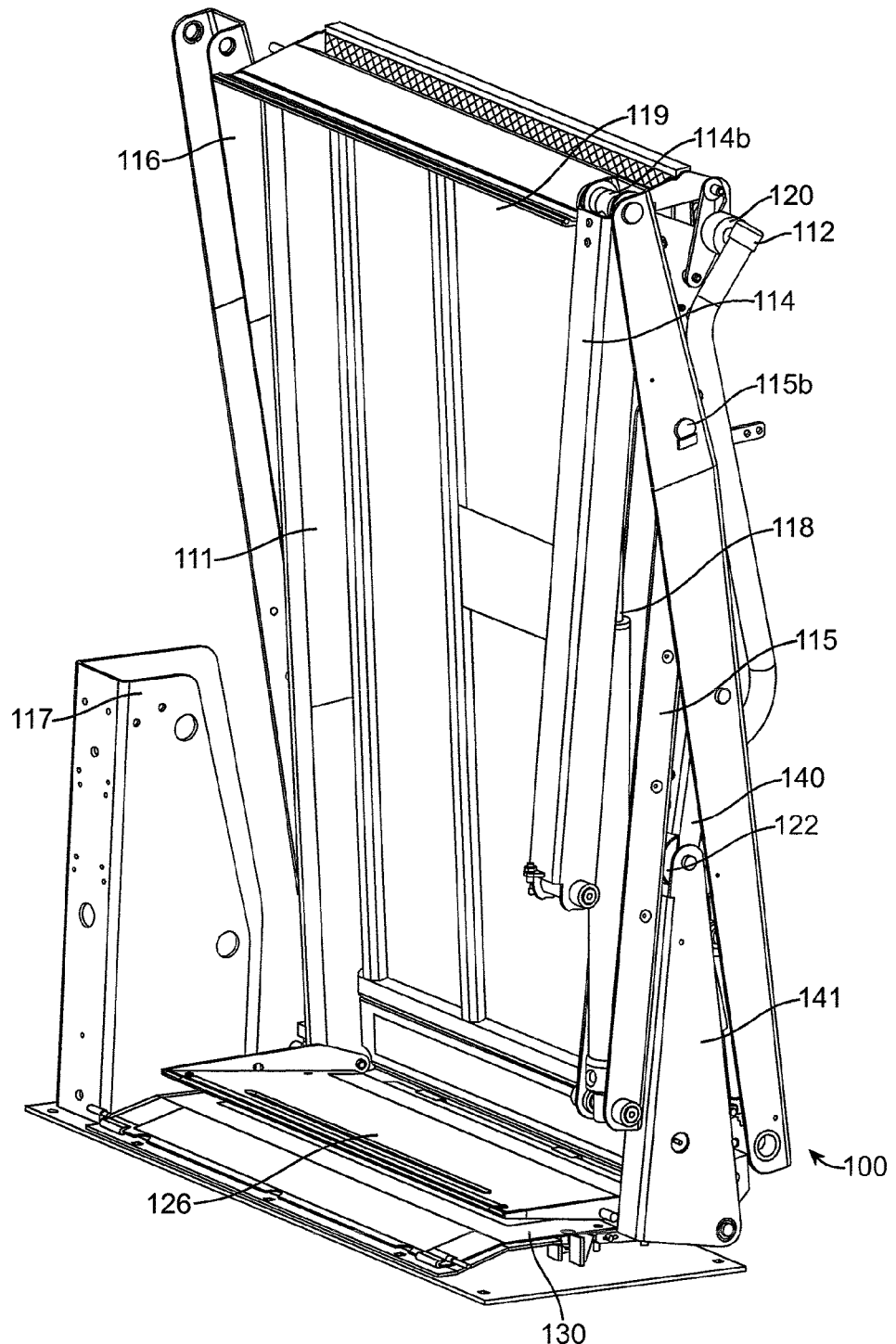
FIG. 3A shows a perspective view of a portion of a lift system in a stowed position.
Figure 3B:
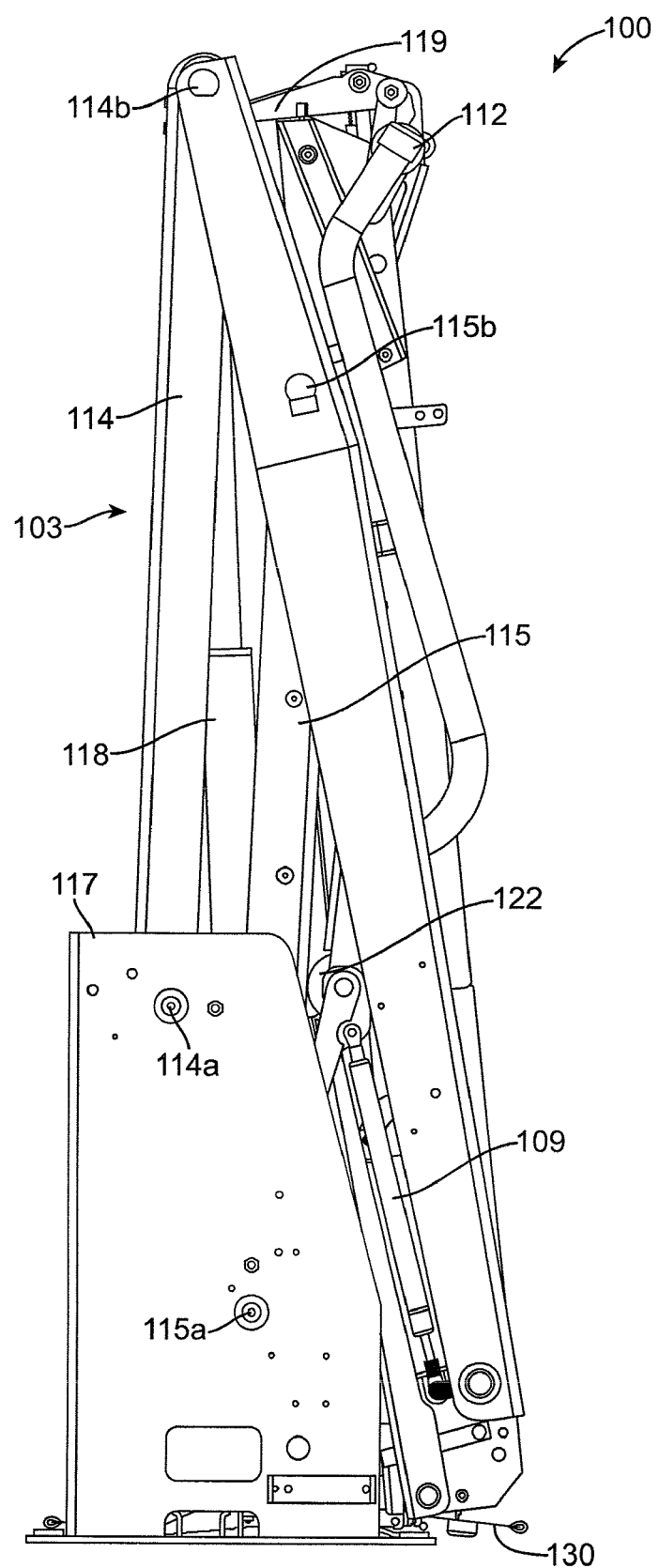
FIG. 3B shows a side view of the lift system in the stowed position as in FIG. 3A.

FIG. 3A shows a perspective view of lift system 100 in a stowed position, when viewed from inside the vehicle. FIG. 3B illustrates a side view of the stowed lift system 100 as in FIG. 3A. As illustrated, lift actuator 118 is fully extended, substantially collapsing the upper parallelogram 103. After platform 111 lifts a small distance, roller 122 begins to push against lower arm 115, and upper stow arm 140 and lower stow arm 141 straighten out and begin to raise platform 111 into a stowed position. Handrails 112 also begin to rise into a stowed position. In one embodiment lift platform 111 folds up into an upright position, and shifts inward toward the vehicle. In some embodiments, hooks or latches are used to prevent platform 111 from shaking or rattling while in the stowed position.

Figure 4A:
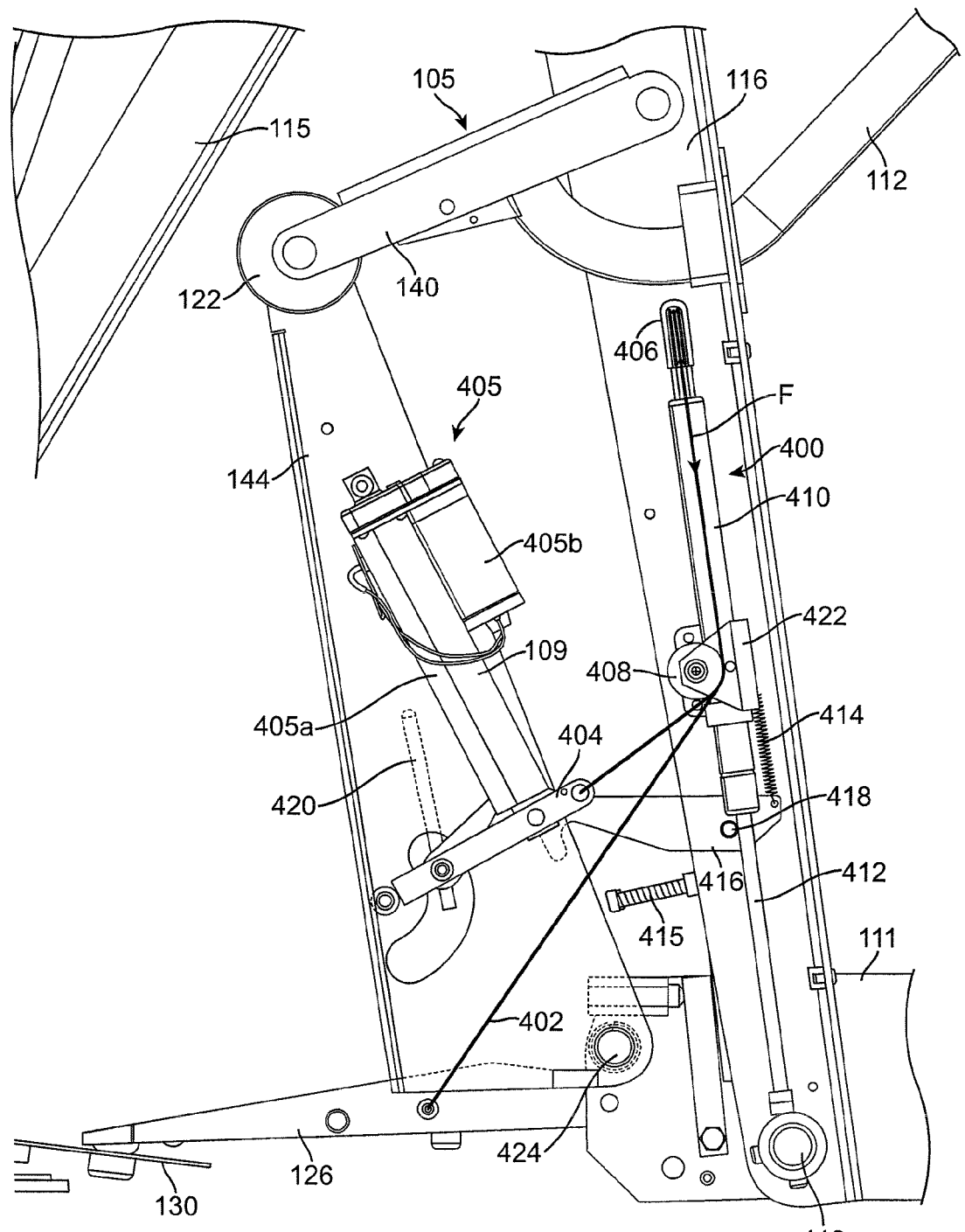
FIG. 4A shows a close up view of a spring member of the inboard roll stop system in a normal operation.

FIG. 4A illustrates a close-up view of spring member 400 connected to inboard roll stop 126 that is acting as a ramp, i.e., substantially level with extension plate 130 as previously shown in FIG. 2B. Spring member 400 is in a slightly different configuration as the embodiment 600 shown in FIG. 1B (and subsequently in FIGS. 6-12). As discussed in detail below, spring member 400 prevents component failures associated with the ramping up and down operations when roll stop 126 is abnormally operated, such as if roll stop 126 jams.

In one embodiment spring member 400 is connected through cable 402 to roll stop 126 and lever 404. In this embodiment lever 404 is configured differently from the embodiment of lever 604 shown in FIG. 1B (and subsequently in FIGS. 7-12). Lever 404 is actuated by roll stop actuator 405, which in accordance with a preferred embodiment of the invention is an electrical actuator. As illustrated, roll stop actuator 405 includes extendable cylinder 405$a$ and electric motor 405$b$. Electric motor 405$b$ drives cylinder 405$a$ to extend or retract to drive lever 404.

In one embodiment the actuating force from actuator 405 is translated to roll stop 126 through cable 402 to ramp up or down roll stop 126. Cable 402 revolves about movable pulley 406 and fixed pulley 408. In this embodiment, movable pulley 406 is connected to outer cylinder 410 of spring member 400. Fixed pulley 408 is connected to vertical arm 116. Outer cylinder 410 of spring member 400 is movable relative to inner cylinder 412. Inner cylinder 412 is fixedly connected to vertical arm 116 at coupler 413. In one embodiment spring member 400 is, for example, a gas spring, which has a gaseous medium sealed in a chamber (not shown) in outer cylinder 410. In one embodiment spring member 400 is compressible by a force F exerted on movable pulley 406 by cable 402. In one embodiment the force required to raise the ramp is over twice the weight (W) of the ramp (e.g., 2.2×W). For example, if W=12 lbs., the required force is 2.2 W=26.4 lbs. In one embodiment, a mechanical disadvantage of a gas spring member 400 has a ratio of 2:1, assuming no friction losses. Then, for the above example, the force on the gas spring member 400 is 2P=52.8 lbs. In order to provide additional safety, the spring force S is assumed greater than 70 lbs. in order to overcome additional friction forces and less than 500 lbs., which is less than the working load of the cable 402.

In one embodiment of the invention, the spring member 400 is substantially collapsed (or compressed) when a force necessary to move the roll stop 126 from a lowered position to a raised position is applied. In this embodiment of the invention, during normal operation the force necessary to move the roll stop 126 from the lowered position to the raised position is below a predetermined threshold. In one embodiment, the predetermined threshold is 2.2 W. In other embodiment, the predetermined threshold is dependent on weigh and displacement. In yet another embodiment, the predetermined threshold includes an additional safety factor for frictional forces in the lift system 100. In yet another embodiment, under abnormal conditions (e.g., additional friction, external object jam, etc.), the force necessary to move the roll stop 126 from the lowered position to the raised position exceeds the predetermined threshold.

In another aspect, the spring member is substantially extended when a force necessary to move the roll stop member from the lowered position to the raised position is applied.

In yet another aspect, during normal operation the force necessary to move the roll stop member from the lowered position to the raised position is below the predetermined threshold.

Spring 414 is connected to vertical arm 116 on one end, and to hook 416 on another end. Hook 416 is pivotally connected to vertical arm 116 at pivot point 418. In one embodiment hook 416, which may be actuated by bar 420, is locks roll stop 126 in place when roll stop 126 is in its upright position. In this embodiment sleeve 422 allows spring member 400 to slide up and down relative to vertical arm 116 while being substantially aligned with vertical aim 116.

Figure 4B:
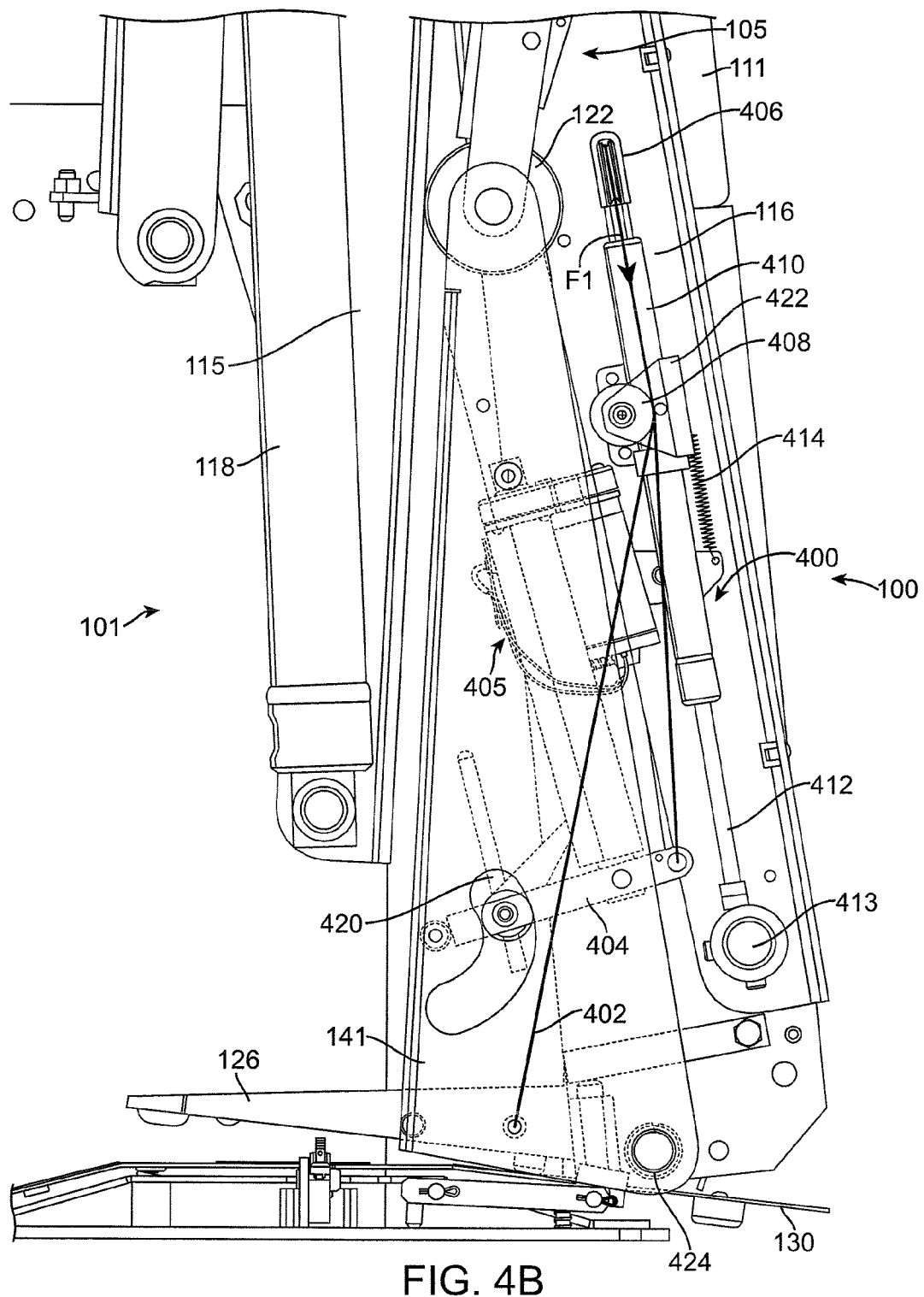
FIG. 4B shows the spring member partially compressed in a normal operation when the lift system is being stowed as in FIG. 3A.

FIG. 4B illustrates lift system 100 in its completely stowed position as in FIG. 3A. Platform 111 is folded up around pivot point 424 by stow linkage 105, and is shifted inward toward vehicle 101. Spring member 400 is partially compressed by the force F1 on movable pulley 406. Because roll stop 126 is relatively light weighted, the force F1 necessary for compression is small, and outer cylinder 410 only travels a small distance during this normal compression of spring member 400.

Figure 4C:
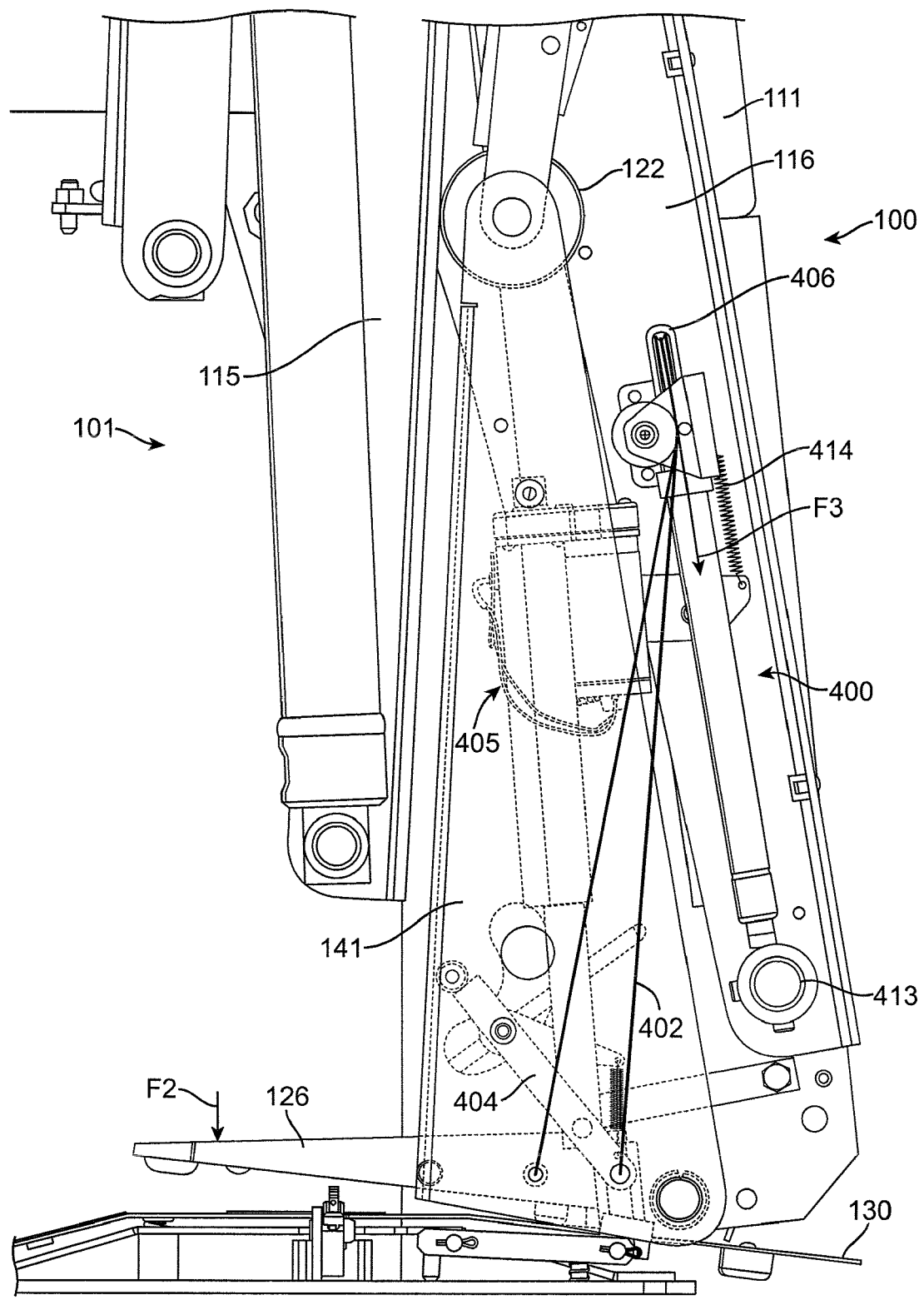
FIG. 4C shows the spring member being fully compressed when the lift system is being unstowed from its stowed position while the inboard roll stop is stuck.

FIG. 4C illustrates a situation when lift system 100 is attempting to un-stow, and a force F2 is exerted on roll stop 126. Force F2 may result from, for example, if roll stop 126 is stuck, or when a passenger in the vehicle 101 inadvertently steps onto roll ramp 126. As shown, actuator 405 drives lever 404 trying to pull up roll ramp 126 through cable 402. The force F3 applied to spring member 400 increases until a full compression is reached. In one embodiment spring force F3 advantageously provides a buffer to prevent, for example, breakage, derailing or tangling of cable 402, or overloading of actuator 405.

Figure 5A:
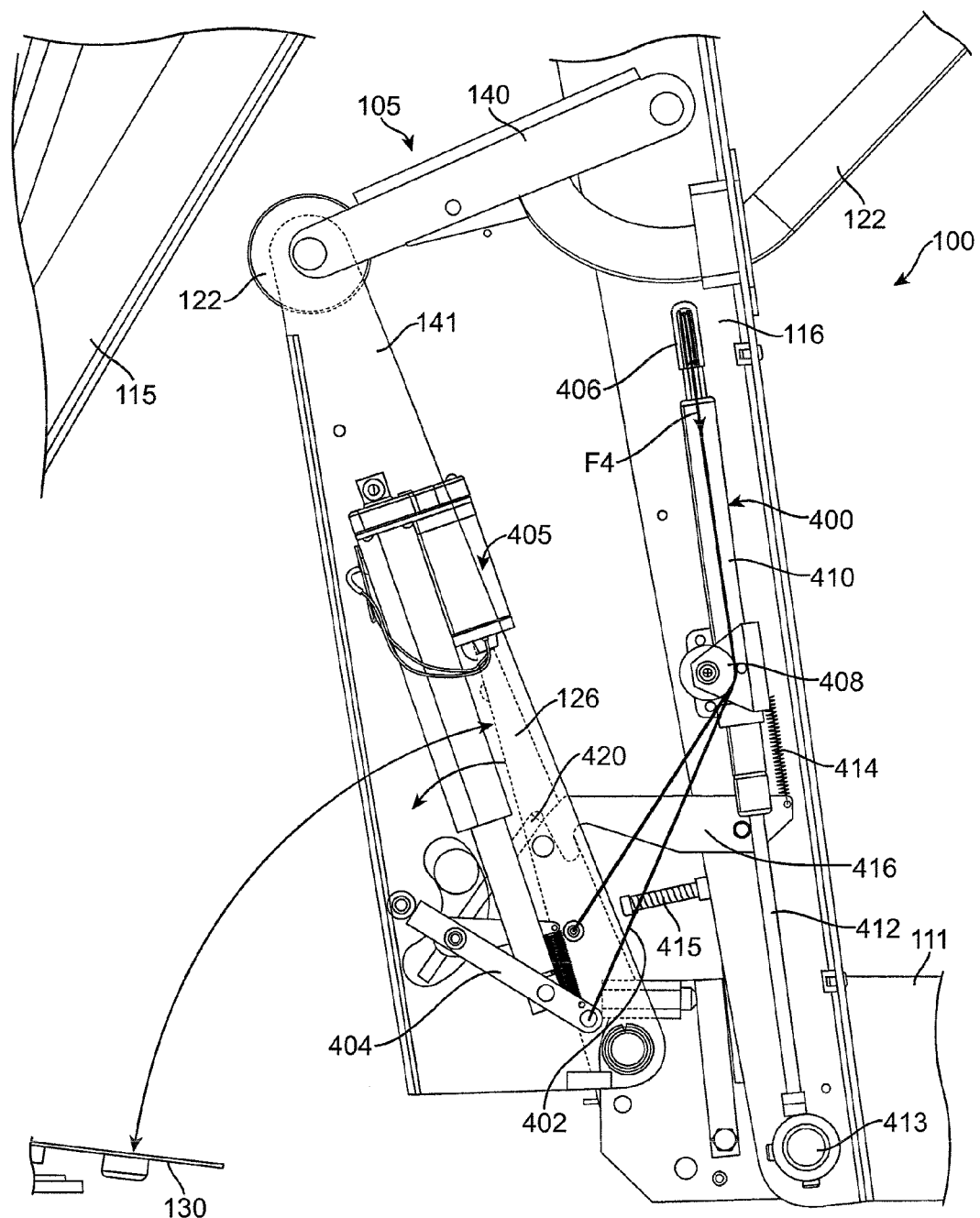
FIG. 5A shows a normal transition process of the lift system while the inboard roll stop is being pulled up.

FIG. 5A illustrates a normal transition process of lift system 100. As shown, the additional force F2 is absent on roll stop 126, and roil stop 126 is being successfully pulled up by cable 402. During this process, the force F4 exerted on movable pulley 406 decreases, and spring member 400 decompresses.

Figure 5B:
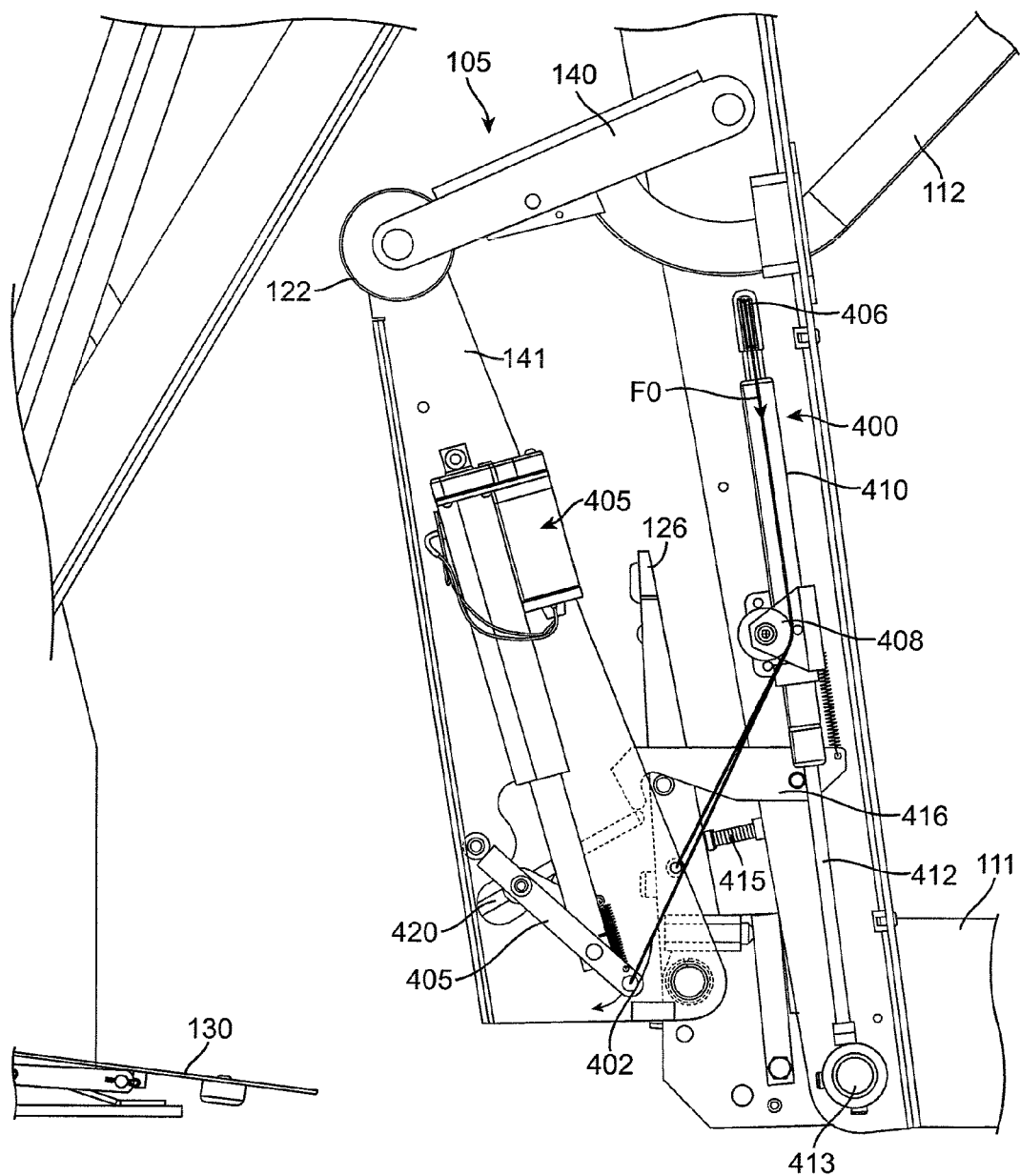
FIG. 5B shows the inboard roll stop in its fully up position while the spring member is fully decompressed.

As illustrated in FIG. 5B, roll stop 126 is in its fully upright position. Hook 416 prevents roll stop 126 from falling into the ramp position. In one embodiment, stopper 415 prevents roll stop 126 from falling inward toward lift platform 111. The force F0 on movable pulley 406 is near zero, and spring member 400 is substantially fully decompressed.

Figure 5C:
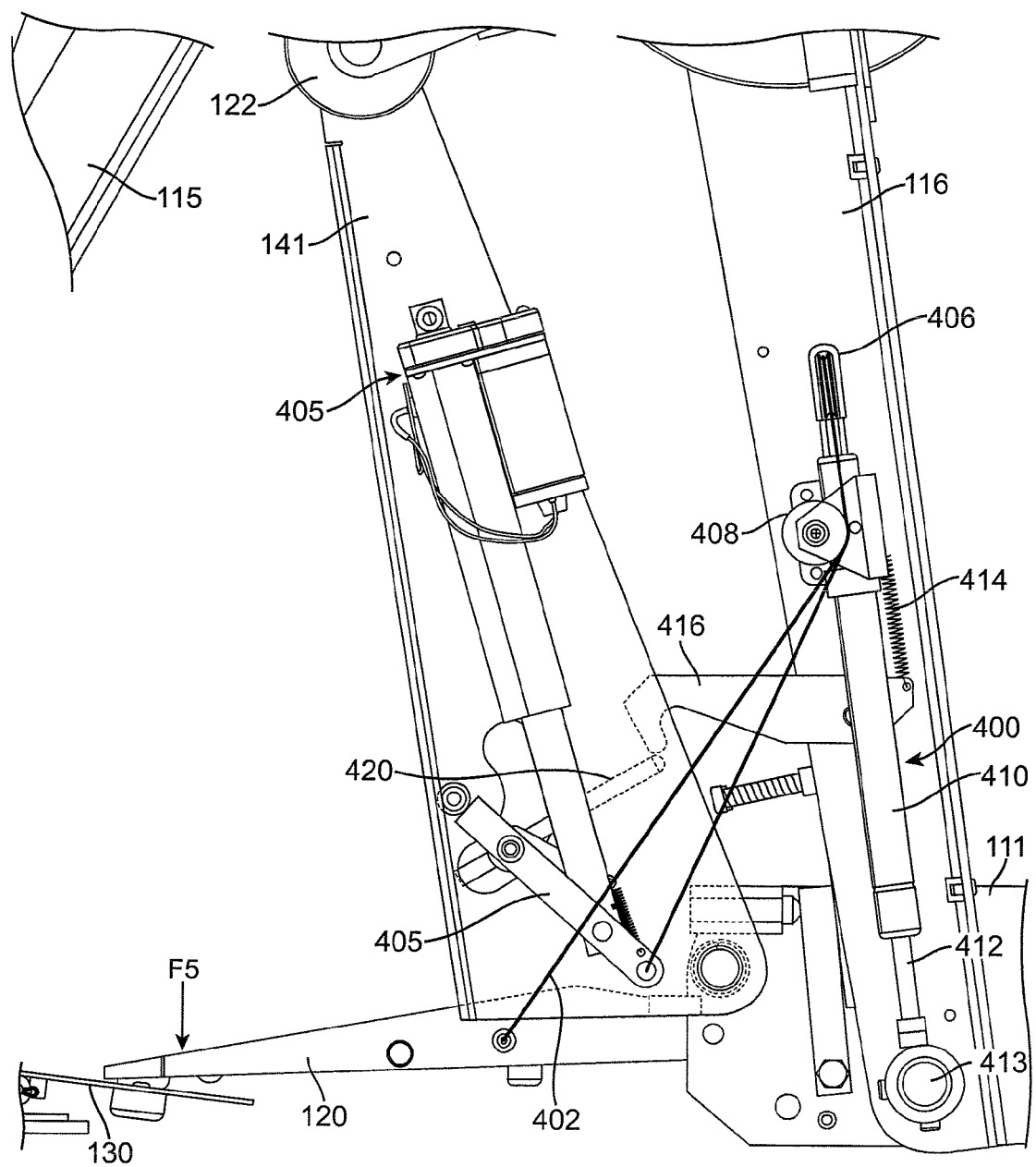
FIG. 5C shows the lift system in transition while the roll stop cannot be pulled up, resulting in the spring member being compressed.

FIG. 5C illustrates an exemplar case where during the process of roll stop 126 being pulled up by cable 402, for example, when platform 111 is about to be lowered and roll stop 126 needs to be raised, an inadvertently applied force F5 is exerted on roll stop 126. In this embodiment, spring member 400 is substantially compressed, acting as a buffer to prevent cable breakage or other component failures.

Figure 6:
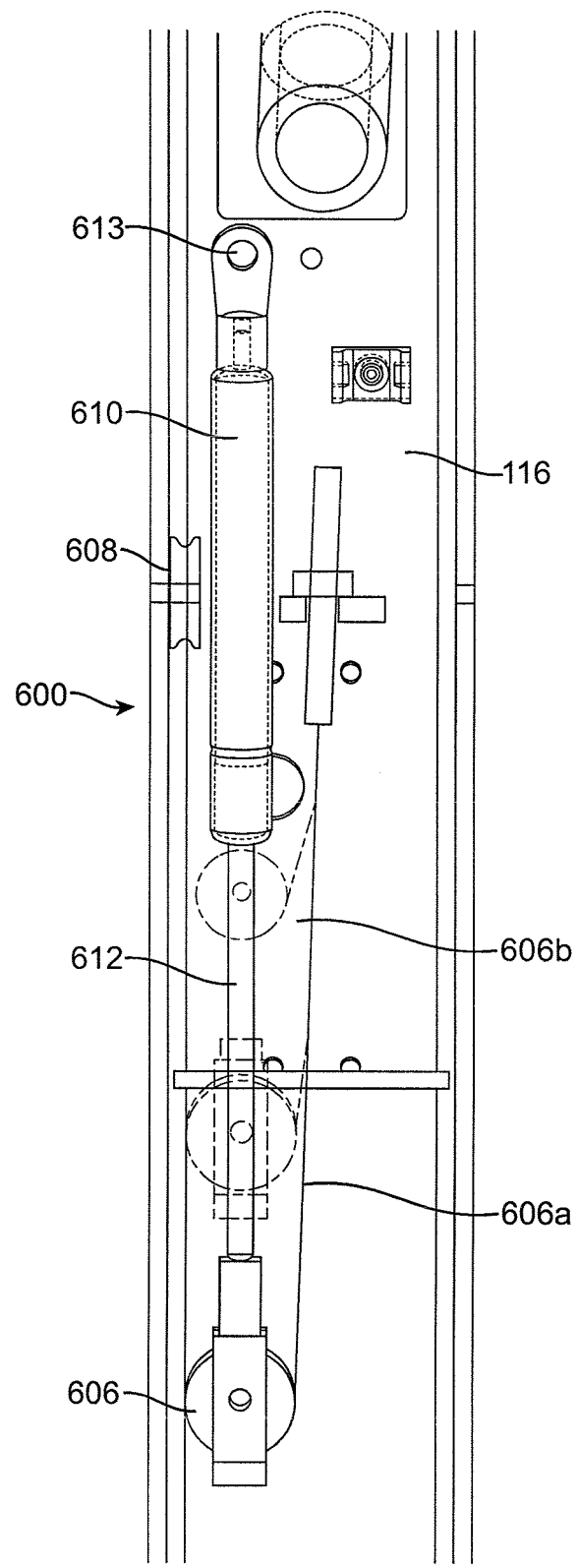
FIG. 6 shows an alternative embodiment of the spring member.

FIG. 6 illustrates the embodiment 600 of the spring member as shown in FIGS. 1A-3B. As shown, spring member 600 is fixedly connected to vertical arm 116 at the outer cylinder 610 side using, for example, bolt 613. Unlike the embodiment 400 shown in FIGS. 4A-5C, movable pulley 606 is disposed at the distal end of inner cylinder 612 instead of the outer cylinder. In one embodiment one or more fixed pulleys 608 may also be needed. Movable pulley 606 is shown in the position when spring member 600 is fully decompressed.

Intermediate position 606*a* and fully compressed position 606*b* are also shown for comparison.

Figure 7:
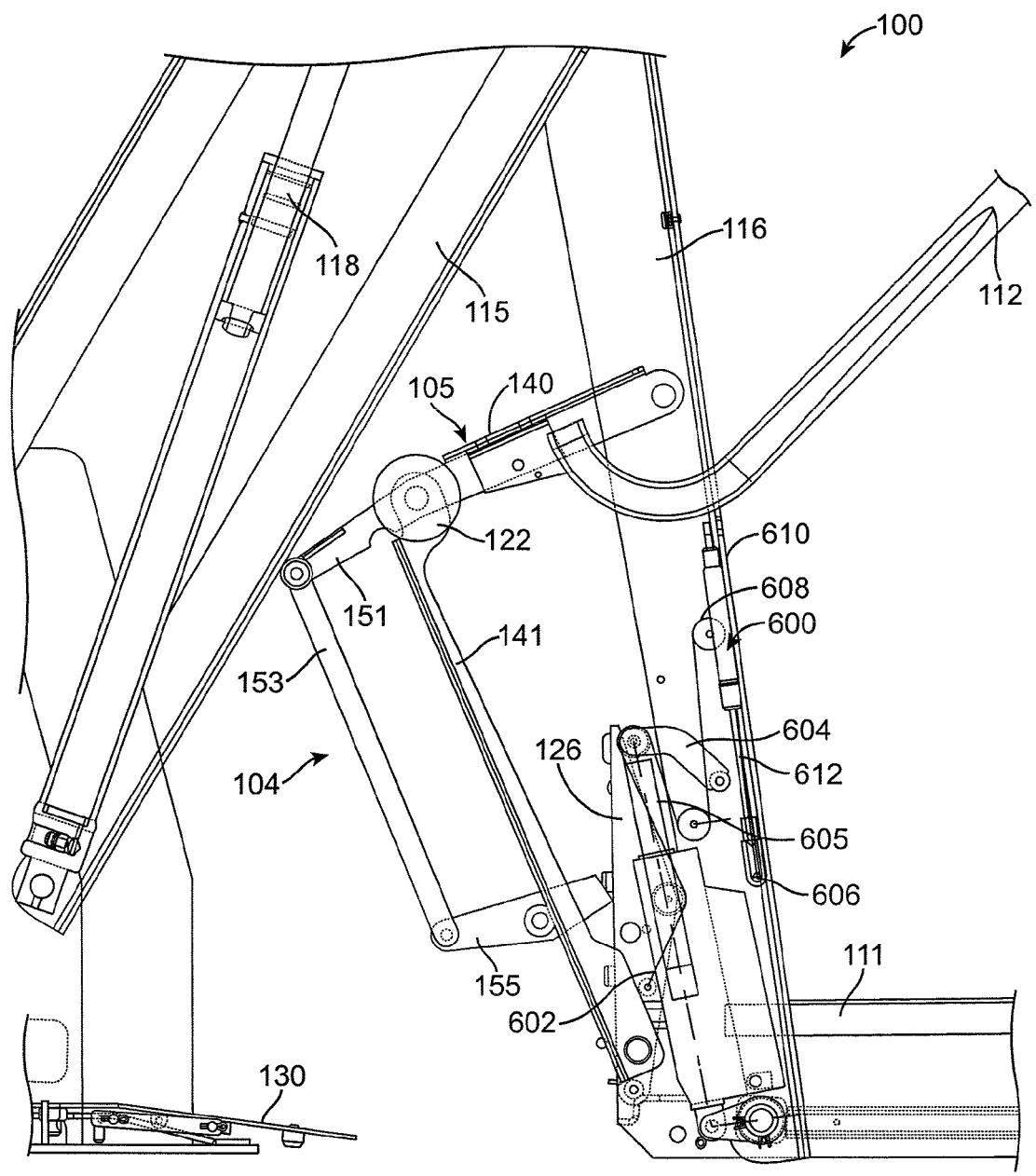
FIG. 7 shows a nom al operation of the inboard roll stop when the lift system is in a transition position.

FIG. 7 illustrates spring member 600 installed in lift system 100. As illustrated lift system 100 is in a transition, while roll stop 126 is in its fully upright position. Spring member 600 is substantially uncompressed. Roll stop 126 is being locked or unlocked by arm 155 of lower parallelogram 104. Thus, hook 416 and bar 420 are not necessary.

Figure 8:
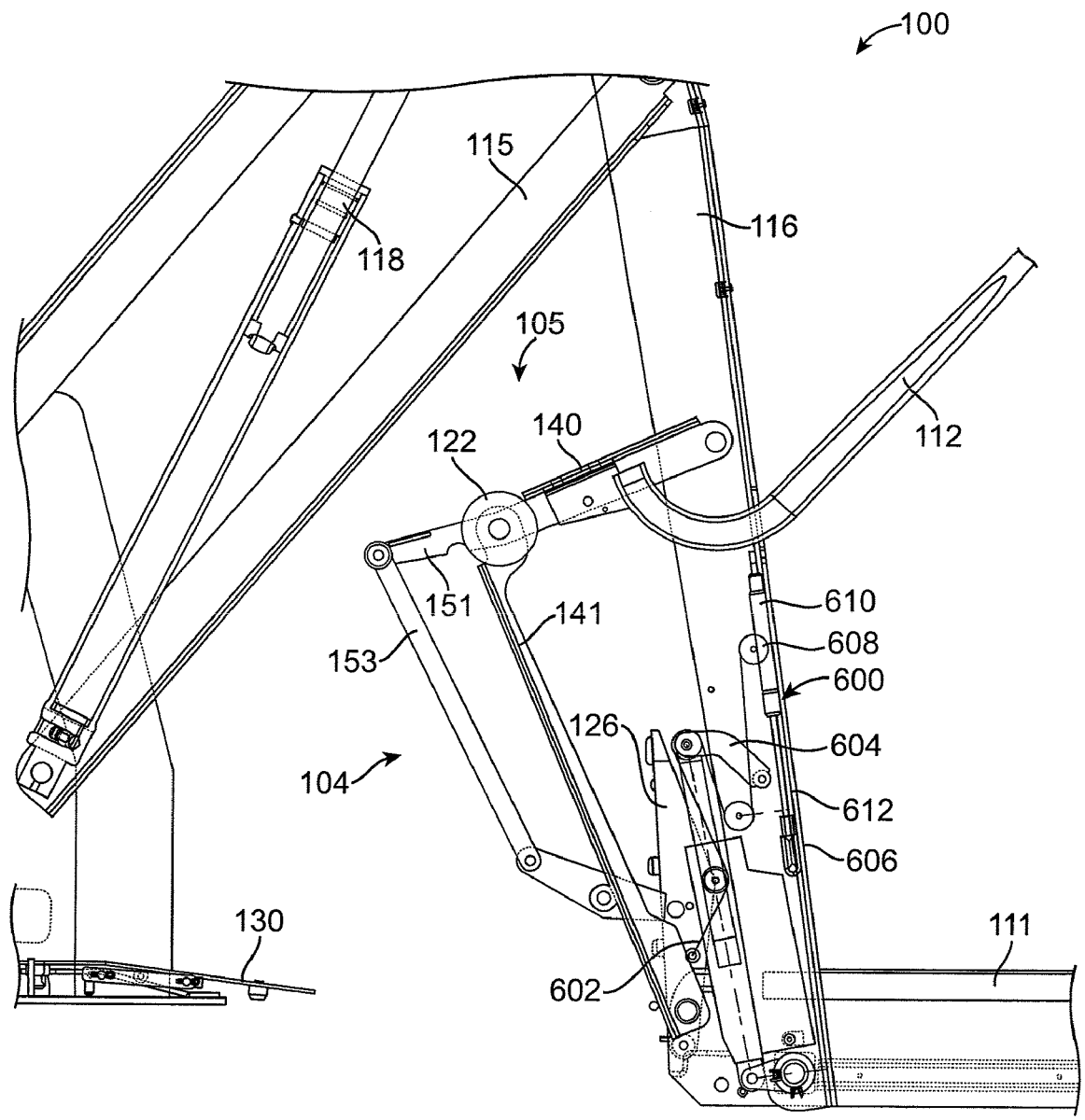
FIG. 8 shows a normal operation of the inboard roll stop being lowered.

FIG. 8 shows the lift system 100 in a transition, when the platform 111 is brought level to the extension plate 130, and the roll stop 126 is being lowered. The lower parallelogram 104 partially collapses, thus unlocking the roll stop 126. As shown, the spring member 600 is only partially compressed, as the force needed for a normal operation of the roll stop 126 is small.

Figure 9:
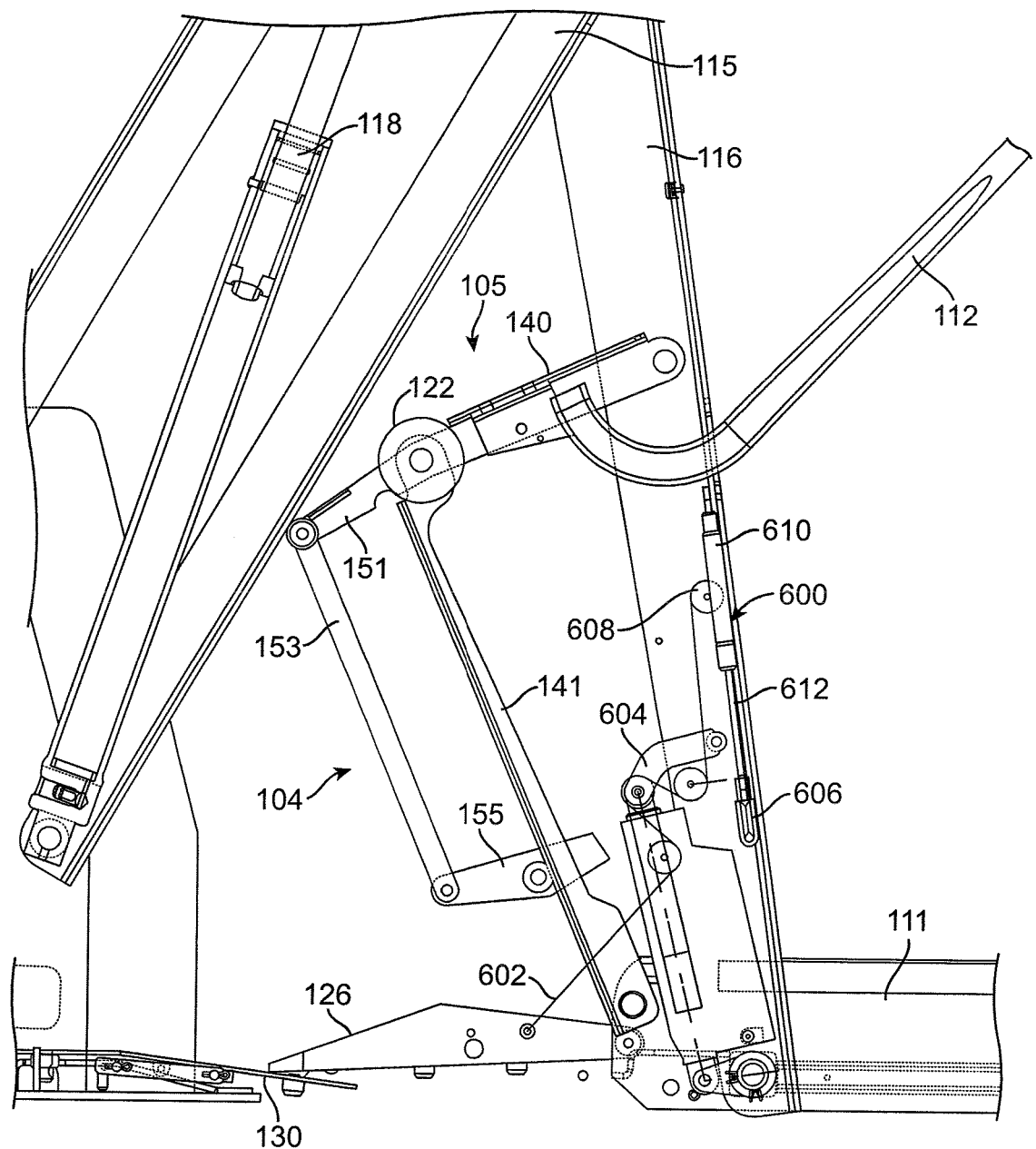
FIG. 9 shows a normal operation of the inboard roll stop being fully lowered when the lift system is in the floor level position.

FIG. 9 illustrates a normal operation as the inboard roll stop 126 is fully lowered to make contact with extension plate 130, when lift system 100 is in a floor level position. Spring member 600 as shown is again substantially fully decompressed.

Figure 10:
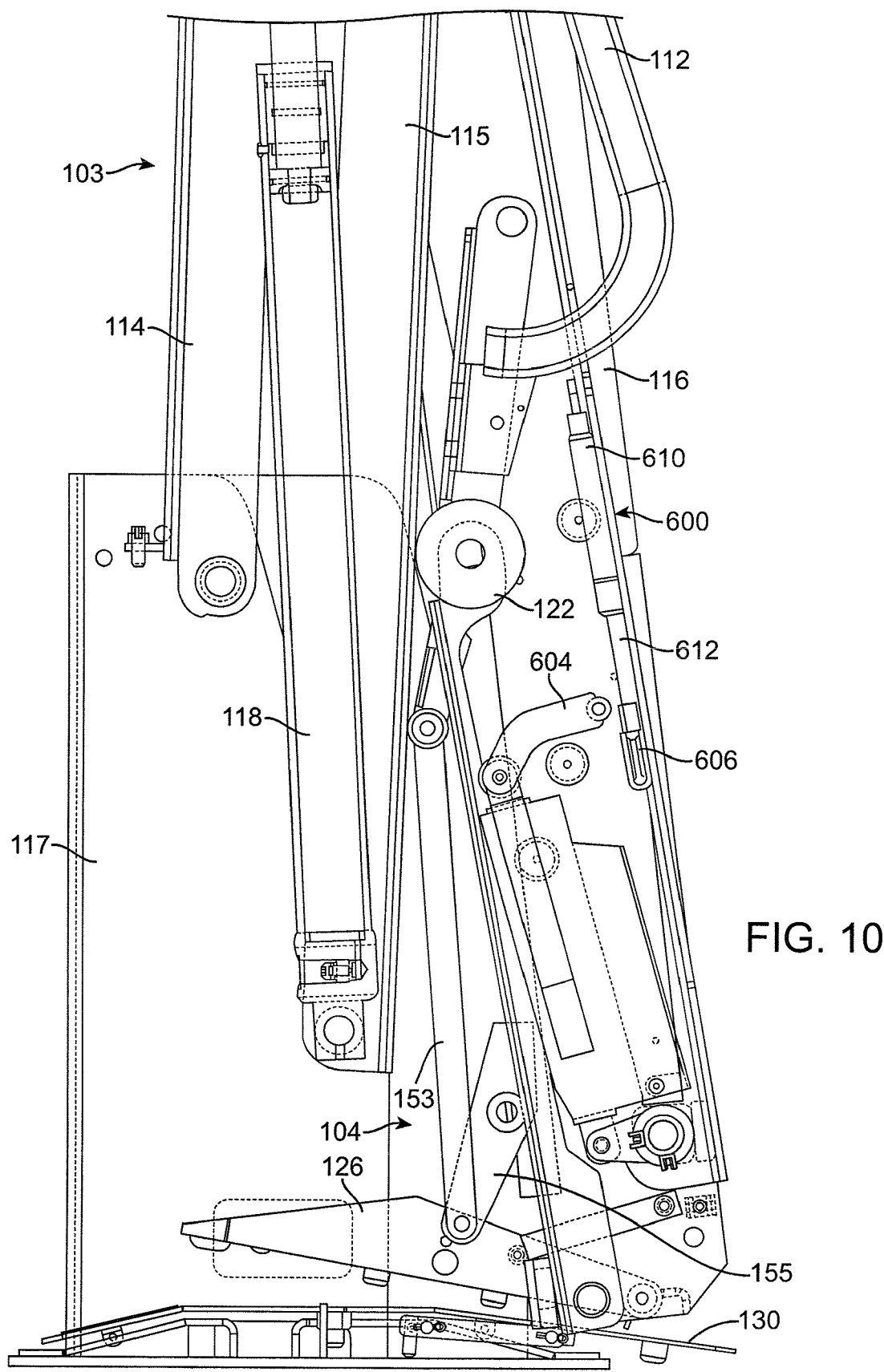
FIG. 10 shows the lift system in its fully stowed position while the spring member is fully decompressed.

FIG. 10 illustrates lift system 100 in its fully stowed position while spring member 600 is partially compressed.

Figure 11:
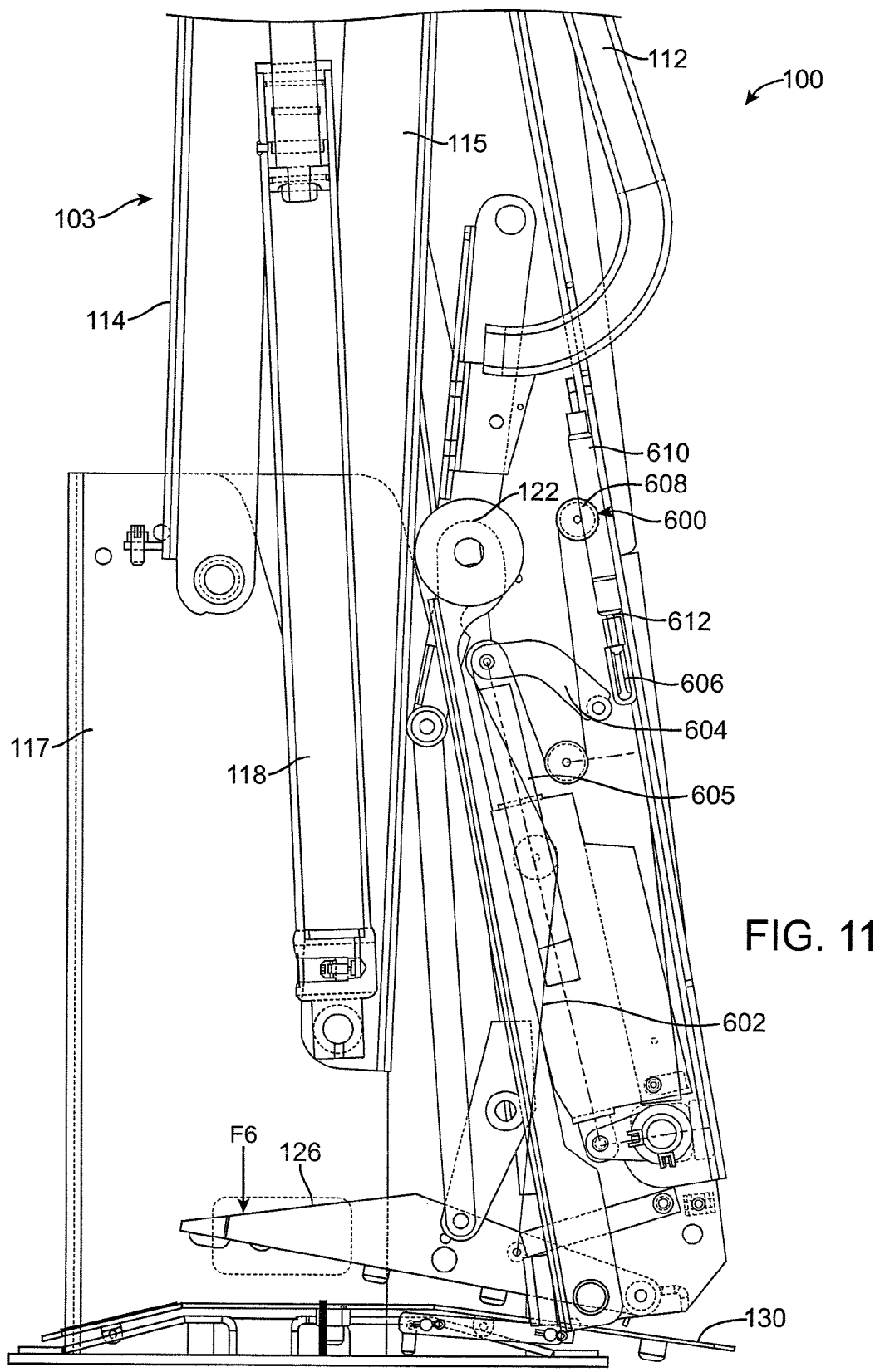
FIG. 11 shows the lift system in its fully stowed position while the spring member is fully compressed.

FIG. 11 illustrates lift system 100 in its fully stowed position. Lever 604, as driven by inboard roll stop actuator 605, attempts to lift roll stop 126. In this exemplar case, roll stop 126 is stuck as indicated by the force F6 exerted on the top surface of roll stop 126. Lever 604 moves up, while spring member 600 is fully compressed.

Figure 12:
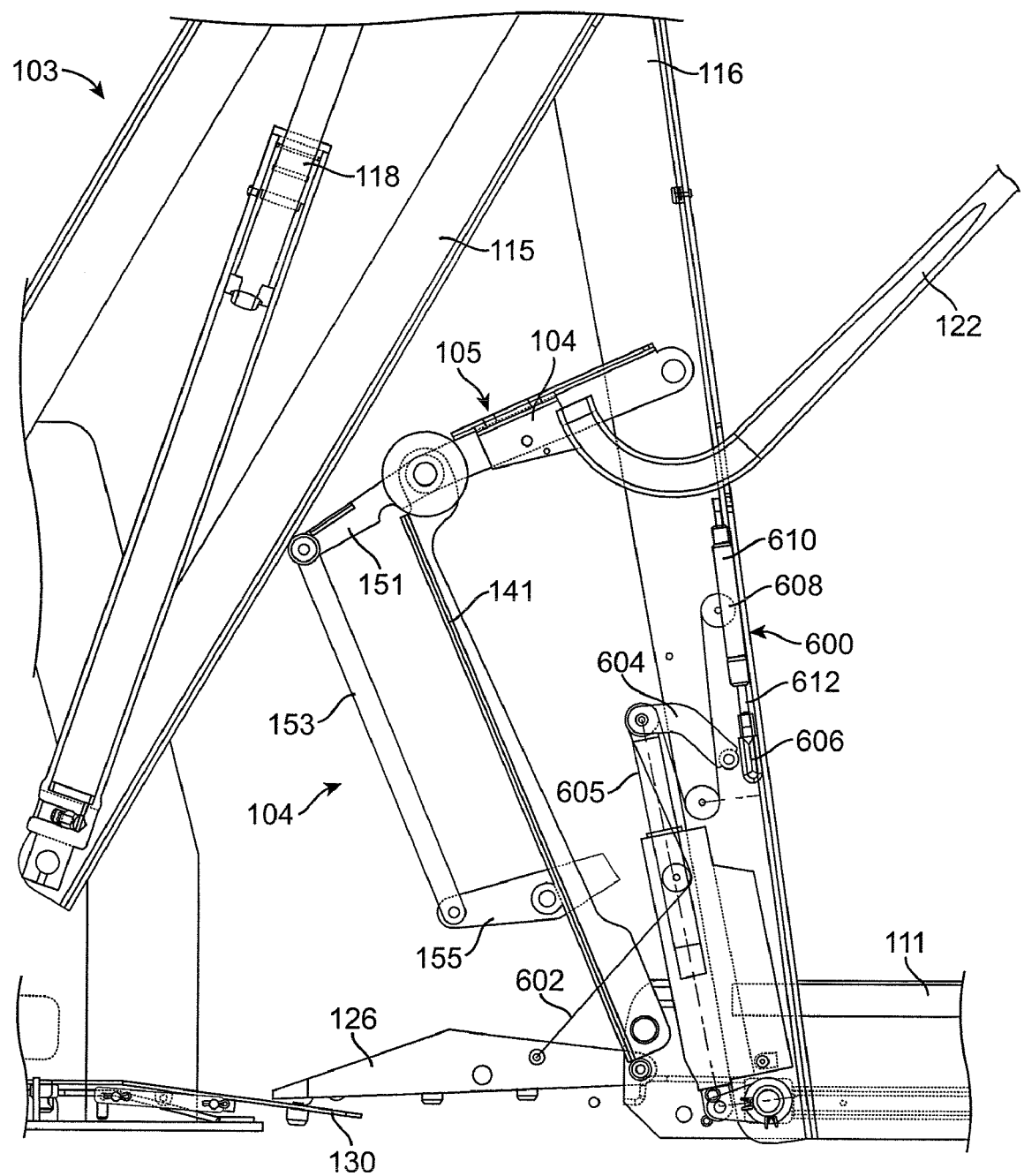
FIG. 12 shows the lift system in its floor level position while the spring member is partially compressed.

FIG. 12 illustrates lift system 100 in its floor level position while spring member 600 is partially compressed as a result of, for example, some blockage on roll stop 126 when lever 604 attempts to lift roll stop 126.

Advantageously, embodiments of the invention provide a roll stop system including a cable and a spring member. The cable avoids the jamming issues of a conventional roll stop system, and the spring member provides a buffer or bumper in case of interference on the normal operation of the roll stop, which helps prevent component failures when excessive force is applied to the roll stop.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A lift system configured for use with a vehicle, the lift system comprising:
    a platform configured to raise and lower cargo to and from a vehicle bed; and
    a roll stop system comprising:
        an inboard roll stop member movable between a raised, essentially upright position and a lowered, essentially horizontal position;
        a driving mechanism comprising a driving lever and a linkage cable, the linkage cable coupled between the driving lever and the inboard roll stop member for rotating the inboard roll stop member between the raised position and the lowered position in response to movement of the driving lever; and
        a spring member engaging a portion of the linkage cable between the driving lever and the inboard roll stop member, such that the spring member exerts a force on the linkage cable during a movement of the inboard roll stop member and/or the driving lever;
        wherein the linkage cable exerts a compressive force on the spring member in response to a motion of the inboard roll stop member when the driving lever remains stationary; and
        wherein the linkage cable exerts a compressive force on the spring member in response to a motion of the driving lever when the roll stop member remains stationary.

2. The lift system of claim 1, wherein:
    the linkage cable is coupled at one end to the inboard roll stop member for raising upright or lowering horizontally the inboard roll stop member;
    the driving lever is coupled to another end of the linkage cable for providing a pulling force; and
    the spring member is elongated and includes a pulley rotatably coupled to an end of the spring member such that the pulley engages said portion of the linkage cable between the driving lever and the inboard roll stop member, allowing the linkage cable to roll over the pulley as the driving lever moves the linkage cable for lowering horizontally or raising upright the inboard roll stop member.

3. The lift system of claim 2, wherein the driving mechanism further comprises an actuator for driving the driving lever, wherein another end of the spring member is fixedly coupled to an arm of the lift system.

4. The lift system of claim 3, wherein:
    the actuator actuates the driving lever to move the linkage cable whereby the linkage cable revolves about the pulley;
    the linkage cable exerts a force on the spring member via the pulley in response to a motion of the inboard roll stop member independent of any motion of the driving lever.

5. The lift system of claim 2, wherein the spring member comprises a gas spring having an outer cylinder and an inner cylinder, and the pulley is rotatably coupled to the outer cylinder, allowing the linkage cable to roll over the pulley as the driving lever moves the linkage cable for lowering horizontally and raising upright the inboard roll stop member.

6. The lift system of claim 2, wherein the spring member comprises a gas spring having an outer cylinder and an inner cylinder, and the pulley is rotatably coupled to the inner cylinder, allowing the linkage cable to roll over the pulley as the driving lever moves the linkage cable for lowering horizontally and raising upright the inboard roll stop member.

7. The lift system of claim 1, wherein the spring member expands when a raising force necessary to move the inboard roll stop member from the lowered horizontal position to the raised upright position is applied by the cable to the spring member in response to a motion of the lever, wherein the raising force is above a threshold.

8. The lift system of claim 7, wherein the cable exerts an expanding force on the spring member in response to a motion of the inboard roll stop member when the lever remains stationary; and
    the cable exerts an expanding force on the spring member in response to a motion of the lever when the inboard roll stop member remains stationary.

9. The lift system of claim 1, wherein the spring member is compressed by the linkage cable when a raising force necessary to move the inboard roll stop member from the lowered, horizontal position to the raised, upright position is applied by the linkage cable to the spring member in response to a motion of the driving lever, wherein the raising force is above a threshold.

10. The lift system of claim 1, wherein during normal operation of the lift system, the raising force necessary to move the inboard roll stop member from the lowered, horizontal position to the raised, upright position is below a predetermined threshold for compressing the spring member.

11. A roll stop system for a lift, comprising:
    an inboard roll stop member movable between a raised, upright position and a lowered, horizontal position;
    a driving mechanism comprising:
        a driving lever; and
        a linkage cable coupled between the driving lever and the inboard roll stop member for rotating the inboard roll stop member between the raised, upright position and the lowered, horizontal position in response to movement of the driving lever, whereby the linkage cable is coupled at one end to the inboard roll stop member and coupled at another end to the driving lever; and
    an elongated spring member, including a pulley rotatable coupled to an end of the spring member such that the pulley engages a portion of the cable between the driving lever and the inboard roll stop member, allowing:
        the linkage cable to revolve about the pulley as the linkage cable rotates the inboard roll stop member between the raised, upright position and the lowered, horizontal position in response to movement of the driving lever;
        the linkage cable to exert a force on the spring member via the pulley due to motion of the inboard roll stop member independent of any motion of the driving lever; and
        the spring member to exert a force on the linkage cable during movement of the inboard roll stop member and/or the driving lever;
    wherein an actuator actuates the driving lever to provide a pulling force for moving the linkage cable.

12. The roll stop system of claim 11, wherein during normal operation the raising force necessary to move the inboard roll stop member from the lowered, horizontal position to the raised, upright position is below a predetermined threshold for compressing the spring member.

13. The roll stop system of claim 12, wherein:
    the linkage cable exerts an expanding force on the spring member in response to a motion of the inboard roll stop member when the driving lever remains stationary; and the linkage cable exerts an expanding force on the spring member in response to a motion of the driving lever when the inboard roll stop member remains stationary.

14. The roll stop system of claim 13, wherein during normal operation the force necessary to move the inboard roll stop member from the lowered, horizontal position to the raised, upright position is below a predetermined threshold for expanding the spring member.

15. The roll stop system of claim 11, wherein:

the spring member comprises a gas spring; and the linkage cable exerts a force on the spring member due to a motion of the inboard roll stop member independent of any motion of the driving lever, thereby the spring member providing a force buffer between the driving mechanism and the inboard roll stop member.

16. The roll stop system of claim 11, wherein the spring member is compressed by the linkage cable when a raising force necessary to move the inboard roll stop member from the lowered, horizontal position to the raised, upright position is applied by the linkage cable to the spring member in response to a motion of the driving lever, wherein the raising force is above a threshold.

17. The roll stop system of claim 11, wherein another end of the spring member is fixedly coupled to an arm of the lift system.

18. The roll stop system of claim 11, wherein the spring member comprises a gas spring having an outer cylinder and an inner cylinder, and the pulley is rotatably coupled to the outer cylinder, allowing the linkage cable to roll over the pulley as the driving lever moves the linkage cable for lowering horizontally and raising upright the inboard roll stop member.

19. The roll stop system of claim 11, wherein the spring member comprises a gas spring having an outer cylinder and an inner cylinder, and the pulley is rotatably coupled to the inner cylinder, allowing the linkage cable to roll over the pulley as the driving lever moves the linkage cable for lowering horizontally and raising upright the inboard roll stop member.

* * * * *